United States Patent
Matsumura

(12) 
(10) Patent No.: US 9,487,682 B2
(45) Date of Patent: Nov. 8, 2016

(54) CURABLE RESIN COMPOSITION, CURED PRODUCT THEREOF, LAMINATE, AND METHOD FOR PRODUCING LAMINATE

(75) Inventor: Kazunari Matsumura, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 511 days.

(21) Appl. No.: 14/009,417

(22) PCT Filed: Apr. 5, 2012

(86) PCT No.: PCT/JP2012/059372
§ 371 (c)(1),
(2), (4) Date: Dec. 20, 2013

(87) PCT Pub. No.: WO2012/137869
PCT Pub. Date: Oct. 11, 2012

(65) Prior Publication Data
US 2014/0120358 A1    May 1, 2014

(30) Foreign Application Priority Data

Apr. 5, 2011  (JP) ................................ 2011-083622

(51) Int. Cl.
| | |
|---|---|
| *B32B 7/12* | (2006.01) |
| *B32B 7/14* | (2006.01) |
| *C08F 4/40* | (2006.01) |
| *C09J 135/02* | (2006.01) |
| *C08F 265/06* | (2006.01) |

(52) U.S. Cl.
CPC ............... *C09J 135/02* (2013.01); *B32B 7/12* (2013.01); *B32B 7/14* (2013.01); *C08F 4/40* (2013.01); *C08F 265/06* (2013.01); *Y10T 428/31935* (2015.04)

(58) Field of Classification Search
None
See application file for complete search history.

(56) References Cited

U.S. PATENT DOCUMENTS

| | | | | |
|---|---|---|---|---|
| 4,343,921 | A * | 8/1982 | Piestert | ...................... C09J 4/00 156/332 |
| 6,420,467 | B1 * | 7/2002 | Ohtsuka | ............... C08F 290/04 428/463 |
| 2010/0035494 | A1 * | 2/2010 | Okada | ...................... C08J 7/047 442/136 |

FOREIGN PATENT DOCUMENTS

| | | |
|---|---|---|
| JP | 52-027176 A | 3/1977 |
| JP | 2002-105142 A | 4/2002 |
| JP | 2003-105157 A | 4/2003 |
| JP | 2004-211003 A | 7/2004 |
| JP | 2007-084782 A | 4/2007 |
| JP | 2010-111757 A | 5/2010 |
| JP | 2010-132876 A | 6/2010 |
| JP | 2010-168580 A | 8/2010 |

OTHER PUBLICATIONS

Li, He-guo et al., "Study on preparation of PU-anaerobic adhesives and the influence factors on resin curing", Chemistry and Adhesion, No. 5, Oct. 31, 2003.
Search Report issued by the Patent Office of People's Republic of China dated Jan. 22, 2015 in the corresponding Chinese Patent Application No. 2012800261231, partial English translation provided.
International Search Report dated Jun. 5, 2012 for International Application No. PCT/JP2012/059372.
Office Action dated Aug. 11, 2015 issued by the Japanese Office Action in corresponding Japanese Patent Application No. 2012-520612.

* cited by examiner

*Primary Examiner* — Sheeba Ahmed
(74) *Attorney, Agent, or Firm* — Morgan, Lewis & Bockius LLP

(57) ABSTRACT

This curable resin composition comprises (A) a polymerizable (meth)acrylic-based monomer, (B) a thiourea compound component, and (C) a peroxide component having a structure of formula (1), and may have (D) a (meth) acrylic-based polymer component as an optional component. (In formula (1), R is a C1-15 hydrocarbon group.) In the curable resin composition, preferably, the content of the (A) component is 5-100 mass % and the content of the (D) component is 0-95 mass % relative to the total mass of the (A) component and the (D) component.

19 Claims, 1 Drawing Sheet

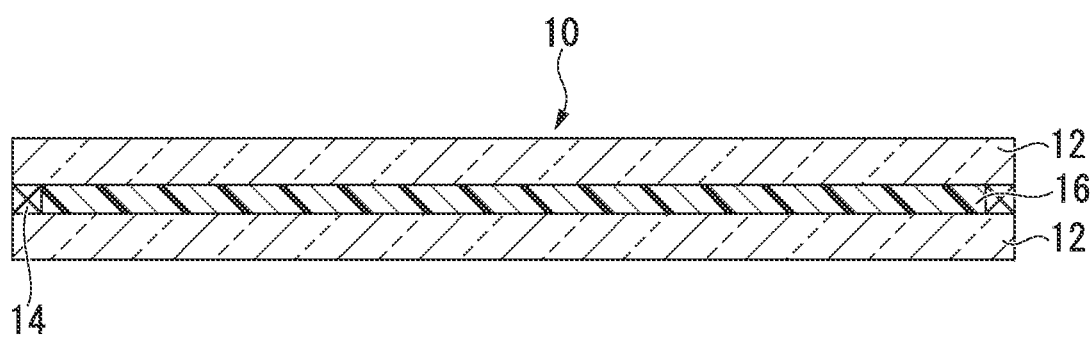

CURABLE RESIN COMPOSITION, CURED PRODUCT THEREOF, LAMINATE, AND METHOD FOR PRODUCING LAMINATE

TECHNICAL FIELD

The present invention relates to a curable resin composition, a cured product thereof and a laminate including this cured product. The present application claims priority based on Japanese Patent Application No. 2011-083622 which was filed in Japan on 5 Apr. 2011, the content of which is incorporated herein by reference.

BACKGROUND ART

Laminates such as laminated glass can also have a soundproofing property, UV screening property, infrared screening property, design characteristics, etc. depending on the desire, in addition to having safety such as shatter-resistance and penetration prevention, as well as transparency. For this reason, they have been widely used in fields such as construction materials, machine tools, and automobiles.

The following methods have been employed as methods for producing laminates.

(i) A method of inserting a resin film such as of polyvinyl butyral between two substrates such as glass plates and resin plates, and then heating and pressing.

(ii) A method of pouring a room-temperature curable resin liquid between two substrates, and adhering by curing. As the room-temperature curable resin liquid, mainly a (meth)acrylic-based resin composition has been used.

As a polymerization initiation system that causes a (meth)acrylic-based resin composition to cure at room temperature, a redox polymerization initiation system that establishes benzoyl peroxide as a hardener and establishes a tertiary amine as a promoter has been widely adopted. However, in the case of using a redox polymerization initiation system, there is a problem in that the cured product stains, and thus adaptation to a laminate for which colorless transparency is demanded is difficult.

As (meth)acrylic-based resin compositions to resolve such issues, the following ones have been disclosed other than polymerization initiation systems combining benzoyl peroxide and a tertiary amine.

(1) A (meth)acrylic-based resin composition containing hydroperoxide as a hardener and a thiourea compound as a promoter is disclosed in Patent Document 1.

(2) A (meth)acrylic-based resin composition containing a peroxide (t-hexylperoxy isopropyl monocarbonate, etc.) as a hardener and a mercapto compound as a promoter is disclosed in Patent Document 2.

However, for the (meth)acrylic-based resin composition of (1), the strength and transparency of the cured product are not considered sufficient.

For the (meth)acrylic-based resin composition of (2), since adequate polymerization reaction does not advance at room temperature, curing defects are of concern.

PRIOR ART DOCUMENTS

Patent Documents

Patent Document 1: Japanese Unexamined Patent Application, Publication No. 2004-211003
Patent Document 2: Japanese Unexamined Patent Application, Publication No. 2003-105157

SUMMARY OF THE INVENTION

Problems to be Solved by the Invention

The present invention provides a curable resin composition that cures at room temperature and for which a cured product having superior strength and transparency is obtained, a cured product thereof, a laminate including this cured product, and a method for producing the laminate thereof.

Means for Solving the Problems

The present invention has the following aspects.
A first aspect of the present invention is a curable resin composition containing:
(A) a polymerizable (meth)acrylic-based monomer component;
(B) a thiourea compound component; and
(C) a peroxide component having a structure of the following formula (1),
in which the composition may contain (D) an (meth)acrylic-based polymer component as an optional component,

R in the formula (1) is a hydrocarbon group with a carbon number of 1 to 15.

A second aspect of the present invention is a curable resin composition in which a content of the (A) component is 5 to 100 mass %, and a content of the (D) component is 0 to 95 mass %, relative to the total mass of the (A) component and the (D) component.

A third aspect of the present invention is a curable resin composition as described in the first aspect in which a content of the (A) component is 40 to 100 mass %, and a content of the (D) component is 0 to 60 mass %, relative to the total mass of the (A) component and the (D) component.

A fourth aspect of the present invention is a curable resin composition as described in the first aspect in which a content of the (A) component is 60 to 100 mass %, and a content of the (D) component is 0 to 40 mass %, relative to the total mass of the (A) component and the (D) component.

A fifth aspect of the present invention is a curable resin composition as described in the first aspect in which a content of the (A) component is 80 to 100 mass %, and a content of the (D) component is 0 to 20 mass %, relative to the total mass of the (A) component and the (D) component.

A sixth aspect of the present invention is a curable resin composition as described in the first aspect in which a content of the (A) component is 80 to 98 mass %, and a content of the (D) component is 2 to 20 mass %, relative to the total mass of the (A) component and the (D) component.

A seventh aspect of the present invention is a curable resin composition as described in any one of the first to sixth aspects, containing: 0.05 to 5 parts by mass of the (C) component; and 0.1 to 10 parts by mass of the (D) component, relative to a total of 100 parts by mass of the (A) component and the (D) component.

An eighth aspect of the present invention is a curable resin composition as described in any one of the first to sixth aspects, containing: 0.1 to 3 parts by mass of the (C)

component; and 0.3 to 7 parts by mass of the (D) component, relative to a total of 100 parts by mass of the (A) component and the (D) component.

A ninth aspect of the present invention is a curable resin composition as described in any one of the first to sixth aspects, containing: 0.15 to 1.5 parts by mass of the (C) component; and 0.5 to 4 parts by mass of the (D) component, relative to a total of 100 parts by mass of the (A) component and the (D) component.

A tenth aspect of the present invention is a cured product obtained by curing the curable resin composition as described in any one of the first to sixth aspects.

An eleventh aspect of the present invention is a cured product obtained by curing the curable resin composition as described in the seventh aspect.

A twelfth aspect of the present invention is a cured product obtained by curing the curable resin composition as described in the eighth aspect.

A thirteenth aspect of the present invention is a cured product obtained by curing the curable resin composition as described in the ninth aspect.

A fourteenth aspect of the present invention is a laminate including a layer consisting of the cured product as described in the tenth aspect between two substrates.

A fifteenth aspect of the present invention is a laminate including a layer consisting of the cured product as described in the eleventh aspect between two substrates.

A sixteenth aspect of the present invention is a laminate including a layer consisting of the cured product as described in the twelfth aspect between two substrates.

A seventeenth aspect of the present invention is a laminate including a layer consisting of the cured product as described in the thirteenth aspect between two substrates.

An eighteenth aspect of the present invention is a method for producing the laminate as described in the fourteenth aspect, including: pouring the curable resin composition as described in any one of the first to sixth aspect between two opposing substrates; and curing the composition.

A nineteenth aspect of the present invention is a method for producing the laminate as described in the fifteenth aspect, including: pouring the curable resin composition as described in the seventh aspect between two opposing substrates; and curing the composition.

A twentieth aspect of the present invention is a method for producing the laminate as described in the sixteenth aspect, including: pouring the curable resin composition as described in the eighth aspect between two opposing substrates; and curing the composition.

A twenty-first aspect of the present invention is a method for producing the laminate as described in the seventeenth aspect, including: pouring the curable resin composition as described in the ninth aspect between two opposing substrates; and curing the composition.

Effects of the Invention

According to the curable resin composition of the present invention, a cured produced curing at room temperature and having superior strength and transparency can be obtained.

The cured product of the present invention has superior strength and transparency.

The laminate of the present invention has superior safety such as penetration prevention and transparency.

The method for producing a laminate of the present invention can produce a laminate having superior safety such as penetration prevention and transparency.

BRIEF DESCRIPTION OF THE DRAWINGS

FIG. 1 is a cross-sectional view showing an example of a laminate of the present invention.

MODE FOR CARRYING OUT THE INVENTION

In the present specification and the claims,
"(meth)acrylic" is a general term for acrylic and methacrylic,
"(meth)acrylate" is a general term for acrylate and methacrylate, and
"(meth)acryloyl group" is a general term for acryloyl group and methacryloyl group, and is represented by $CH_2=C(R)-C(=O)-$ (R is a hydrogen atom or methyl group).

Curable Resin Composition

A curable resin composition of the present invention contains (A) a polymerizable (meth)acrylic-based monomer component, (B) a thiourea compound component, and (C) a peroxide component having a structure of formula (1). The curable resin composition of the present invention may further contain (D) a (meth)acrylic-based polymer component as an optional component. In this specification, (A) the polymerizable (meth)acrylic-based monomer component is referred to as (A) component, (B) the thiourea compound component is referred to as (B) component, (C) the peroxide component having a structure of formula (1) is referred to as (C) component, and (D) the (meth)acrylic-based polymer component is referred to as (D) component. In the curable resin composition of the present invention, the contents of the (A) component and the (D) component are preferably 5 to 100 mass % of the (A) component and 0 to 95 mass % of the (D) component relative to the total mass of the (A) component and the (D) component.

(A) Component

The polymerizable (meth)acrylic-based monomer that is the (A) component is a compound having a (meth)acryloyl group. It may be a monofunctional compound having one (meth)acryloyl group within the molecular structure, and may be a polyfunctional compound having two or more (meth)acryloyl groups within the molecular structure.

As specific examples of the (A) component, (meth)acrylic acid, methyl (meth)acrylate, ethyl (meth)acrylate, propyl (meth)acrylate, n-butyl (meth)acrylate, i-butyl (meth)acrylate, t-butyl (meth)acrylate, heptyl (meth)acrylate, 2-ethylhexyl (meth)acrylate, n-octyl (meth)acrylate, isooctyl (meth)acrylate, n-nonyl (meth)acrylate, isononyl (meth)acrylate, decyl (meth)acrylate, lauryl (meth)acrylate, tridecyl (meth)acrylate, stearyl (meth)acrylate, cyclohexyl (meth)acrylate, benzyl (meth)acrylate, phenyl (meth)acrylate, dicyclopentenyl (meth)acrylate, dicyclopentenyloxyethyl (meth)acrylate, isobornyl (meth)acrylate, dicyclopentanyl (meth)acrylate, adamantyl (meth)acrylate, methoxyethyl (meth)acrylate, ethoxyethyl (meth)acrylate, butoxyethyl (meth)acrylate, tetrahydrofurfuryl (meth)acrylate, 2-hydroxyethyl (meth)acrylate, 2-hydroxypropyl (meth)acrylate, 4-hydroxybutyl (meth)acrylate, glycidyl (meth)acrylate, 3-(meth)acryloxypropyl trimethoxysilane, 2-(meth)acryloyloxyethyl acid phosphate, 2-ethylhexyl diethylene glycol (meth)acrylate, ethylene glycol di(meth)acrylate, polyethylene glycol di(meth)acrylate, 1,3-propylene glycol di(meth)acrylate, polypropylene glycol di(meth)acrylate, 1,3-butylene glycol di(meth)acrylate, 1,4-butylene glycol di(meth)acrylate, polybutylene glycol di(meth)acrylate, neopentyl glycol di(meth)acrylate, 1,6-hexanediol di(meth)acrylate, polycarbonate diol di(meth)acrylate, ε-caprolactone-modified tris((meth)acryloxyethyl)isocyanurate, bisphenol A-ethylene oxide adduct di(meth)acrylate, and the like can be exemplified.

The (A) component may employ one type individually, or may jointly employ two or more types.

Although it may depend due to the required characteristics of the laminate of the present invention differing, the curable resin composition of the present invention preferably contains at least an alkyl (meth)acrylate as the (A) component, from the aspect of the weather resistance of the cured product being favorable. As the alkyl (meth)acrylate, methyl methacrylate is preferable from the aspect of transparency of the cured product; ethyl (meth)acrylate, n-butyl (meth)acrylate, 2-ethylhexyl (meth)acrylate and 2-ethylhexyl diethylene glycol (meth)acrylate are preferable from the aspect of flexibility, and di(meth)acrylates are preferable from the aspect of strength.

(B) Component

The thiourea compound that is the (B) component is a promoter, and reacts with the (C) component to cause a radical to be produced.

As specific examples of the (B) component, thiourea, ethylene thiourea, N,N'-dimethyl thiourea, N,N'-diethyl thiourea, N,N'-dipropyl thiourea, N,N'-di-n-butyl thiourea, N,N'-dilauryl thiourea, N,N'-diphenyl thiourea, trimethyl thiourea, 1-acetyl-2-thiourea, 1-benzoyl-2-thiourea and the like can be exemplified.

The (B) component may employ one type individually, or may jointly employ two or more types.

As the (B) component, N,N'-diethyl thiourea and N,N'-di-n-butyl thiourea are particularly preferable from the aspect of the strength of the cured product.

When defining the total amount of the (A) component and the (D) component as 100 parts by mass, the blending amount of the (B) component is preferably 0.05 to 5 parts by mass, more preferably 0.1 to 3 parts by mass, even more preferably 0.2 to 2 parts by mass, and particularly preferably 0.15 to 1.5 parts by mass. By setting the blending amount of the (B) component to at least 0.05 parts by mass, the curability of the curable resin composition of the present invention will be favorable. In addition, the strength of the cured product of the present invention will be favorable. By setting the blending amount of the (B) component to no more than 5 parts by mass, the transparency of the cured product of the present invention will be favorable.

(C) Component

Peroxide containing the structure of the following formula (1), which is the (C) component, is a hardener, and reacts with the (B) component to generate radicals.

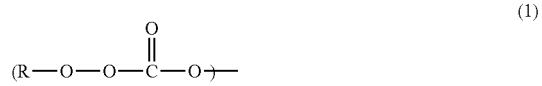

(1)

In formula (1), R is a hydrocarbon group having a carbon number of 1 to 15. R may be saturated or unsaturated, and may be linear, branched or cyclic. R is preferably a C4 to C8 hydrocarbon group, and is preferably saturated and branched from the aspect of solubility in the (A) component.

As specific examples of the (C) component, t-hexylperoxy isopropyl monocarbonate, t-butylperoxy isopropyl monocarbonate, t-butylperoxy 2-ethylhexyl monocarbonate, t-butylperoxy allyl monocarbonate, 1,6-bis(t-butylperoxy carbonyloxy)hexane and the like can be exemplified.

The (C) component may employ one type individually, or may jointly employ two or more types.

As the (C) component, t-hexylperoxy isopropyl monocarbonate and t-butylperoxy 2-ethylhexyl monocarbonate are particularly preferable from the aspect of solubility in the (A) component and transparency of the cured product.

When defining the total amount of the (A) component and the (D) component as 100 parts by mass, the blending amount of the (C) component is preferably 0.1 to 10 parts by mass, more preferably 0.3 to 7 parts by mass, and even more preferably 0.5 to 4 parts by mass. By setting the blending amount of the (C) component to at least 0.1 parts by mass, the curability of the curable resin composition of the present invention will be favorable. In addition, the strength of the cured product of the present invention will be favorable. By setting the blending amount of the (C) component to no more than 10 parts by mass, the transparency of the cured product of the present invention will be favorable.

(D) Component

Although the (meth)acrylic-based polymer that is the (D) component is an optional component, by further adding the (D) component, it is possible to improve the strength of the cured product of the present invention. The (meth)acrylic-based polymer is a polymer containing at least 50 mass % of a (meth)acrylic-based monomer unit in the composition. The (meth)acrylic-based monomer is a monomer having a (meth) acryloyl group, and the unit is a repeating unit that constitutes the polymer. The (meth)acrylic-based monomer may be a monofunctional monomer, or may be a polyfunctional monomer. A monofunctional monomer is preferable from the aspect of solubility in the (A) component.

As specific examples of the (meth)acrylic-based monomer, (meth)acrylic acid, methyl (meth)acrylate, ethyl (meth) acrylate, propyl (meth)acrylate, n-butyl (meth)acrylate, i-butyl (meth)acrylate, t-butyl (meth)acrylate, heptyl (meth) acrylate, 2-ethylhexyl (meth)acrylate, n-octyl (meth)acrylate, isooctyl (meth)acrylate, n-nonyl (meth)acrylate, isononyl (meth)acrylate, decyl (meth)acrylate, lauryl (meth) acrylate, tridecyl (meth)acrylate, stearyl (meth)acrylate, cyclohexyl (meth)acrylate, benzyl (meth)acrylate, phenyl (meth)acrylate, dicyclopentenyl (meth)acrylate, dicyclopentenyloxyethyl (meth)acrylate, isobornyl (meth)acrylate, dicyclopentanyl (meth)acrylate, adamantyl (meth)acrylate, methoxyethyl (meth)acrylate, ethoxyethyl (meth)acrylate, butoxyethyl (meth)acrylate, tetrahydrofurfuryl (meth)acrylate, 2-hydroxyethyl (meth)acrylate, 2-hydroxypropyl (meth)acrylate, 4-hydroxybutyl (meth)acrylate, glycidyl (meth)acrylate, 3-(meth)acryloxypropyl trimethoxysilane, 2-(meth)acryloyloxyethyl acid phosphate, 2-ethylhexyl diethylene glycol (meth)acrylate, ethylene glycol di(meth) acrylate, polyethylene glycol di(meth)acrylate, 1,3-propylene glycol di(meth)acrylate, polypropylene glycol di(meth) acrylate, 1,3-butylene glycol di(meth)acrylate, 1,4-butylene glycol di(meth)acrylate, polybutylene glycol di(meth)acrylate, neopentyl glycol di(meth)acrylate, 1,6-hexanediol di(meth)acrylate, polycarbonate diol di(meth)acrylate, ε-caprolactone-modified tris((meth)acryloxyethyl)isocyanurate, bisphenol A-ethylene oxide adduct di(meth)acrylate, and the like can be exemplified.

The (meth)acrylic-based monomer units contained in the (D) component may be of one type, or may be of two or more types. In addition, the (D) component may include other monomer unit other than the (meth)acrylic-based monomer unit. As the other monomer, it is acceptable so long as co-polymerizable with the (meth)acrylic-based monomer and, for example, a vinyl-based monomer such as styrene can be exemplified. The proportion of the (meth)

acrylic-based monomer unit in the (D) component is preferably at least 70 mass %, and more preferably at least 80 mass %. The upper limit of this proportion is not particularly limited, and may be 100 mass %.

As specific examples that are preferable of the (D) component, polymethyl methacrylate, polyethyl methacrylate, polybutyl methacrylate, copolymers composed of methyl methacrylate units and n-butyl methacrylate units, copolymers composed of methyl methacrylate units and n-butylacrylate units, and the like can be exemplified. Among these, a copolymer composed of methyl methacrylate units and n-butyl methacrylate units is preferable from the aspect of solubility in the (A) component and transparency of the cured product.

The weight average molecular weight of the (D) component is preferably 10,000 to 500,000, and more preferably 30,000 to 200,000. When the weight average molecular weight is at least 10,000, there is an effect on improving the strength of the cured product. When the weight average molecular weight is no more than 500,000, the solubility in the (A) component will be favorable.

The (D) component can be used in a state dissolved in the (A) component in the curable resin composition of the present invention. As a method of dissolving in the (A) component, agitating at room temperature, agitating under heating, etc. can be exemplified. Due to being able to dissolve in a short time, agitating under heating is particularly preferable, and in this case, performing for 0.5 to 5 hours at 40 to 100° C. is preferable.

When defining the total amount of the (A) components and the (D) component as 100 mass %, the blending amount of the (D) component is preferably 0 to 60 mass %, more preferably 0 to 40 mass %, even more preferably 0 to 20 mass %, and particularly preferably 2 to 20 mass %. By blending the (D) component, the strength of the cured product may improve. As the blending amount of the (D) component decreases, the viscosity declines, and the workability during molding becomes favorable.

Other Components

The curable resin composition of the present invention may contain other components in a range not harming the effects of the present invention.

As specific examples of the other components, a radical polymerizable monomer other than acrylic based such as a vinyl-based monomer, a polymer of a radical polymerizable monomer other than acrylic based such as a vinyl-based monomer, and various additives such as antioxidants, plasticizers, ultraviolet light absorbers, silane coupling agents, antifoaming agents, polymerization inhibitors, fillers and fluorescent substances can be exemplified.

In addition, in order to further improve the strength of the cured product, a thermal polymerization initiator such as an azo compound and a peroxide other than the (C) component, and a photopolymerization initiator such as 1-hydroxycyclohexyl phenyl ketone may be added as the other components.

The content of the other components is not particularly limited; however, it is preferably no more than 10 parts by mass, and more preferably no more than 5 parts by mass relative to a total of 100 parts by mass of the (A) to (D) components.

Production Method

The production method of the curable resin composition of the present invention is not particularly limited; however, it is preferable to perform agitation and mixing of a plurality of the (A) components beforehand, or agitation and mixing of the (A) component and the (D) component to make a resin liquid. In the case of using only the (A) component, if the (A) component is a single (meth)acrylic-based polymerizable monomer, an agitation operation will not particularly be required. If the (A) component is a plurality of (meth) acrylic-based polymerizable monomers, it is preferable to perform agitation and mixing at room temperature or under heating at approximately 40 to 80° C. for 1 to 30 minutes. In the case of using the (A) component and the (D) component, it is preferable to agitate and mix under heating at approximately 40 to 100° C. for 0.5 to 5 hours.

The (B) component may be mixed simultaneously at the time of agitation and mixing of the (A) component and the (D) component, and may be agitated and mixed at room temperature into the resin liquid immediately before curing the curable resin composition.

The (C) component is preferably agitated and mixed at room temperature into the resin liquid immediately before curing the curable resin composition from the aspect of the storage stability of the curable resin composition.

Operational Effects

The curable resin composition of the present invention combines the (C) component that is the hardener, i.e. peroxide containing the structure of formula (1), with the (B) component that is a promoter, i.e. thiourea compound. According to the polymerization initiation system of such a specific combination, a cured product is obtained that cured at room temperature and has more superior strength and transparency.

Cured Product

The cured product of the present invention is obtained by curing the curable resin composition of the present invention.

The curing method is not particularly limited; however, a method of adding the (C) component to the resin liquid in which the (B) component is dissolved, a method of adding the (B) component to a resin liquid in which the (C) component is dissolved, a method of mixing a resin liquid in which the (B) component is dissolved and a resin liquid in which the (C) component is dissolved, and the like can be exemplified. A method adding the (C) component to a resin liquid in which the (B) component is dissolved is preferable from the aspect of workability and storage stability.

The cured product of the present invention can be produced by causing to cure by leaving the curable resin composition of the present invention containing all of the components to stand, for example. The ambient temperature for leaving to stand is not particularly limited; however, 10 to 45° C. is preferable, 15 to 40° C. is more preferable, and 20 to 35° C. is even more preferable. By setting the ambient temperature to at least 10° C., the curability of the curable resin composition will be favorable. In addition, the strength of the cured product will be favorable. By setting the ambient temperature to no more than 45° C., the time until cured will lengthen, and it will be easier to carry out the molding operation. In addition, the heat generation during curing will decrease, and upon producing a laminate, foaming of an intermediate layer and deformation of the substrate used will be suppressed. Although the setting time may depend due to the rate of progression of the curing reaction greatly differing according to the setting temperature, amount of the (B) component and the amount of the (C) component, if the setting temperature is 15 to 40° C., the curing reaction will approximately finish when the setting time is 0.5 to 30 hours.

Since the curing reaction is susceptible to inhibition by oxygen, it is preferable to cure by establishing so as to avoid contact between oxygen and the curable resin composition, such as curing by injecting in an air-tight cell or container, curing under an inert gas atmosphere such as nitrogen, and curing under a cover by a polyethylene terephthalate film or the like. In addition, it is preferable to perform a degassing operation to decrease the dissolved oxygen content in the curable resin composition.

Laminate

The laminate of the present invention includes a layer composed of the cured product of the present invention between two substrates as an intermediate layer. FIG. 1 is a cross-sectional view showing an example of the laminate of the present invention. A laminate 10 has two substrates 12, a frame-shaped gasket 14 provided between the two substrates 12 along the circumferential edge of the substrates 12, and an intermediate layer 16 made by injecting the curable resin composition of the present invention into the gap enclosed by the two substrates 12 and the gasket 14, and then allowing to cure.

As the substrates, a glass plate, resin plate, resin film and the like can be exemplified. As the material of the resin plate and resin film, a transparent resin such as an acrylic resin, polycarbonate, and polyethylene terephthalate are preferable.

The thickness of the intermediate layer is preferably 0.05 to 30 mm.

As specific examples of the laminate of the present invention, laminated glass including the cured product of the present invention as an intermediate layer; a laminate of glass and a resin plate including the cured product of the present invention as an intermediate layer; a laminate of a resin plate and a resin plate including the cured product of the present invention as an intermediate layer; a laminate of a resin film and a resin film including the cured product of the present invention as an intermediate layer; and the like can be exemplified.

As applications of the laminate of the present invention, a building material, machining tool window, vehicle glazing, display components, photovoltaic cell components, lighting components, etc. can be exemplified.

The method for producing a laminate of the present invention is not particularly limited so long as being a method such that pours the curable resin composition of the present invention between two opposing substrates, and then allows the composition to cure. As such a method, for example, a method that provides a gap using a gasket or the like between two substrates, injects the curable resin composition of the present invention that has been degassed into this gap, seals a filler port, and allows the composition to cure, thereby integrating the obtained layer of cured product and the two substrates; and the like can be exemplified.

The cured product of the present invention excels in transparency and strength; therefore, the laminate including this has high transparency and safety such as penetration prevention. In addition, since the curable resin composition of the present invention is curable at room temperature, it also excels in energy savings during production of the laminate.

EXAMPLES

Hereinafter, the present invention will be explained specifically by way of examples; however, the present invention is not to be limited to these. In the present examples, "parts" indicates "parts by mass". Measurement and evaluation of the present examples were conducted in accordance with the following methods.

Weight Average Molecular Weight

Weight average molecular weight was obtained by dissolving the polymer in tetrahydrofuran, which is a solvent, and subjecting the molecular weight measured employing gel permeation chromatography to polystyrene conversion.

Curability

The below such evaluation by eyesight was performed for the curability of the curable resin composition.

(Evaluation Criteria of Curability)
A: After leaving to stand for 24 hours at 25° C. while sealed in a cell, cured.
C: After leaving to stand for 24 hours at 25° C. while sealing in a cell, did not cure.

Transparency of Cured Product

The haze of a 3-mm thick cured product was measured in accordance with JIS K7136. A haze meter model HM-150 manufactured by Murakami Color Research Laboratory was used in the measurement. Evaluation was carried out with the following criteria.

(Evaluation Criteria for Transparency of Cured Product)
AA: haze less than 2%
A: haze at least 2% to less than 5%
B: haze at least 5% to less than 10%
C: haze at least 10%
D: not evaluated due to not having cured Strength of Cured Product From the 3-mm thick cured product, No. 3 dumbbell shapes defined by JIS K6251 were punched out, and tensile strength measurement was conducted on the obtained dumbbell-shaped test pieces. The tensile rate was set to 500 mm/min. The test was performed for three test pieces, and the average value thereof was evaluated. It should be noted that the tensile strength was calculated using the following formula (2).

$$\text{Tensile strength(MPa)} = \text{maximum point load}(N) / \text{cross-sectional area of test piece(mm}^2) \qquad (2)$$

(Evaluation Criteria for Strength of Cured Product)
AA: at least 5 MPa
A: at least 3 MPa to less than 5 MPa
B: at least 1.5 MPa to less than 3 MPa
C: less than 1.5 MPa
D: not evaluated due to not having cured Synthesis Example 1

To the synthesis equipment equipped with an agitator, cooling tube and thermometer, 145 parts of deionized water, and 0.5 parts of polyvinyl alcohol with 80% degree of gelation and 1,700 degree of polymerization as a dispersion stabilizer were added, and agitated. After completely dissolving the polyvinyl alcohol, the agitation was stopped, 40 parts of methyl methacrylate, 60 parts of n-butyl methacrylate, 0.1 parts of 2,2'-azobisisobutyronitrile, 0.5 parts of n-dodecyl mercaptan, and 0.3 parts of sodium sulfate were added, and then agitated again. Nitrogen substitution was performed under agitation, and then heated to 70° C. to perform polymerization. After detecting the peak of polymerization heat generation, it was heated to 98° C., reaction was further carried out for 0.5 hours, and then cooled to 40° C. The obtained aqueous suspension was filtered with a nylon filtrating cloth of 45 μm sieve opening, and the filtrate was washed with deionized water. After dehydration, it was dried for 20 hours at 40° C. to obtain a granular (meth) acrylic-based polymer. This polymer was a co-polymer of methyl methacrylate and n-butyl methacrylate, the weight ratio of monomers being methyl methacrylate/n-butyl methacrylate=40/60, and the weight average molecular weight (Mw) being 60,000. Hereinafter, this (meth)acrylic-based polymer is referred to as polymer 1.

Production Example 1

As the (A) component, 54.5 parts of methyl methacrylate, 45 parts of n-butyl acrylate, and 0.5 parts of 1,3-butylene glycol dimethacrylate were blended, and then agitated and mixed at room temperature. The blended product was defined as resin liquid 1.

Production Example 2

As the (A) component, 49.5 parts of methyl methacrylate, 10 parts of n-butyl acrylate, 20 parts of 2-ethylhexyl methacrylate, 20 parts of 2-ethylhexyl acrylate, and 0.5 parts of 1,3-butylene glycol dimethacrylate were blended, and then agitated and mixed at room temperature. The blended product was defined as resin liquid 2.

Production Example 3

As the (A) component, 54.5 parts of methyl methacrylate, 40 parts of n-butyl acrylate, and 0.5 parts of 1,3-butylene glycol dimethacrylate were placed in a reaction vessel equipped with a cooler, and 5 parts of polymer 1 were added in small quantities as the (D) component while agitating. After all had been added, the reaction solution was heated to 60° C., and agitated for 2 hours while maintaining the temperature. After 2 hours, following confirming that polymer 1 had completely dissolved, it was cooled to obtain resin liquid 3.

Example 1

To 100 parts of resin liquid 1, 0.2 parts of N,N'-diethyl thiourea manufactured by Wako Pure Chemical Industries, Ltd. was added as the (B) component, and then agitated and mixed until completely dissolved. To the agitated and mixed product, 2 parts of t-hexylperoxy isopropyl monocarbonate was further added as the (C) component, and then agitated and mixed. The product arrived at by degassing this was poured into a cell made from two glass plates coated with polyethylene terephthalate film and a gasket made of vinyl chloride resin, and then sealed airtight. After leaving to stand for 24 hours at 25° C., the glass on both sides and polyethylene terephthalate films were peeled off to obtain a 3-mm thick cured product.

The respective evaluations were performed for the curable resin composition and cured product. The results are shown in Table 1.

Examples 2 to 16

Cured products were obtained similarly to Example 1 except for changing the compositional ratios as in Table 1, and the respective evaluations were performed.

Comparative Examples 1 to 3

In Comparative Examples 1 to 3, the compositional ratios were changed as in Table 1. In Comparative Example 1, cumene hydroperoxide manufactured by Kayaku Akzo Corp. was used as the hardener. In Comparative Example 2, thiosalicyclic acid manufactured by Wako Pure Chemical Industries, Ltd. was used as the promoter. In Comparative Example 3, t-butylperoxy 2-ethylhexanoate manufactured by NOF Corp. was used as the hardener. Otherwise, cured products were obtained similarly to Example 1, and the respective evaluations were performed. Concerning Comparative Examples 2 and 3, since the resin liquid was not cured, and thus a cured product was not obtained, evaluations relating to the cured product were not carried out.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (A)Component (parts) | MMA | 54.5 | 54.5 | 54.5 | 54.5 | 54.5 | 54.5 | 54.5 | 54.5 | 54.5 | 54.5 |
| | n-BA | 45 | 45 | 45 | 45 | 45 | 45 | 45 | 45 | 45 | 45 |
| | EHMA | — | — | — | — | — | — | — | — | — | — |
| | EHA | — | — | — | — | — | — | — | — | — | — |
| | BDMA | 0.5 | 0.5 | 0.5 | 0.5 | 0.5 | 0.5 | 0.5 | 0.5 | 0.5 | 0.5 |
| (D)Component (parts) | Polymer 1 | — | — | — | — | — | — | — | — | — | — |
| (B)Component (parts) | Diethyl thiourea | 0.2 | 0.5 | 0.5 | 0.5 | 0.7 | 1 | — | — | 0.5 | 0.5 |
| | Dibutyl thiourea | — | — | — | — | — | — | 0.5 | — | — | — |
| | Diphenyl thiourea | — | — | — | — | — | — | — | 0.5 | — | — |
| (C)Component (parts) | PERHEXYL I | 2 | 1 | 2 | 3 | 2 | 2 | 2 | 2 | — | — |
| | PERBUTYL I | — | — | — | — | — | — | — | — | 2 | — |
| | PERBUTYL E | — | — | — | — | — | — | — | — | — | 2 |
| Other Components (parts) | KAYACUMENE H | — | — | — | — | — | — | — | — | — | — |
| | PERBUTYL O | — | — | — | — | — | — | — | — | — | — |
| | Thiosalicyclic acid | — | — | — | — | — | — | — | — | — | — |
| | Curability | A | A | A | A | A | A | A | A | A | A |
| | Haze/% | 1.7 | 1.5 | 1.8 | 1.3 | 1.5 | 1.5 | 1.3 | 1.0 | 3.1 | 1.9 |
| Transparency evaluation of cured product | | AA | AA | AA | AA | AA | AA | AA | AA | A | AA |
| Tensile strength/MPa | | 6.52 | 8.35 | 8.63 | 7.89 | 8.38 | 9.17 | 9.31 | 4.47 | 4.30 | 4.52 |
| Strength evaluation of cured product | | AA | AA | AA | AA | AA | AA | AA | A | A | A |

| | | Example 11 | Example 12 | Example 13 | Example 14 | Example 15 | Example 16 | Comparative Example 1 | Comparative Example 2 | Comparative Example 3 |
|---|---|---|---|---|---|---|---|---|---|---|
| (A)Component (parts) | MMA | 49.5 | 54.5 | 54.5 | 54.5 | 54.5 | 54.5 | 54.5 | 54.5 | 54.5 |
| | n-BA | 10 | 40 | 45 | 45 | 45 | 45 | 45 | 45 | 45 |
| | EHMA | 20 | — | — | — | — | — | — | — | — |
| | EHA | 20 | — | — | — | — | — | — | — | — |
| | BDMA | 0.5 | 0.5 | 0.5 | 0.5 | 0.5 | 0.5 | 0.5 | 0.5 | 0.5 |

TABLE 1-continued

| | | | | | | | | | | |
|---|---|---|---|---|---|---|---|---|---|---|
| (D)Component (parts) | Polymer 1 | — | 5 | — | — | — | — | — | — | — |
| (B)Component (parts) | Diethyl thiourea | 0.2 | 0.2 | 0.1 | 0.5 | 0.5 | 2 | 1 | — | 1 |
| | Dibutyl thiourea | — | — | — | — | — | — | — | — | — |
| | Diphenyl thiourea | — | — | — | — | — | — | — | — | — |
| (C)Component (parts) | PERHEXYL I | 2 | 2 | 2 | 0.4 | 5 | 2 | — | 2 | — |
| | PERBUTYL I | — | — | — | — | — | — | — | — | — |
| | PERBUTYL E | — | — | — | — | — | — | — | — | — |
| Other Components (parts) | KAYACUMENE H | — | — | — | — | — | — | 2 | — | — |
| | PERBUTYL O | — | — | — | — | — | — | — | — | 2 |
| | Thiosalicyclic acid | — | — | — | — | — | — | — | 0.5 | — |
| | Curability | A | A | A | A | A | A | A | C | C |
| | Haze/% | 3.0 | 1.5 | 1.6 | 3.5 | 1.6 | 1.9 | 19 | D | D |
| Transparency evaluation of cured product | | A | AA | AA | A | AA | AA | C | | |
| Tensile strength/MPa | | 6.45 | 8.18 | 1.79 | 4.54 | 6.30 | 8.75 | 1.03 | D | C |
| Strength evaluation of cured product | | AA | AA | B | A | AA | AA | D | | |

The abbreviations in the tables are as follows.
MMA: methyl methacrylate
n-BA: n-butyl acrylate
EHMA: 2-ethylhexyl methacrylate
EHA: 2-ethylhexyl acrylate
BDMA: 1,3-butylene glycol dimethacrylate
Polymer 1: copolymer of methyl methacrylate and n-butyl methacrylate obtained in Synthesis Example 1
Diethyl thiourea: N,N'-diethyl thiourea manufactured by Wako Pure Chemical Industries, Ltd.
Dibutyl thiourea: N,N'-di-n-butyl thiourea manufactured by Wako Pure Chemical Industries, Ltd.
Diphenyl thiourea: N,N'-diphenyl thiourea manufactured by Wako Pure Chemical Industries, Ltd.
PERHEXYL I: t-hexylperoxy isopropyl monocarbonate manufactured by NOF Corp.; Tradename: PERHEXYL I
PERBUTYL I: t-butylperoxy isopropyl monocarbonate manufactured by NOF Corp.; Tradename: PERBUTYL I
PERBUTYL E: t-butylperoxy 2-ethylhexyl monocarbonate manufactured by NOF Corp.; Tradename: PERBUTYL E
KAYACUMENE H: cumene hydroperoxide manufactured by Kayaku Akzo Corp.; Tradename: KAYACUMENE H
PERBUTYL O: t-butylperoxy 2-ethylhexanoate manufactured by NOF Corp.; Tradename: PERBUTYL O
Thiosalicyclic acid: thiosalicyclic acid manufactured by Wako Pure Chemical Industries, Ltd.

As shown in Table 1, Examples 1 to 16 all have favorable curability of the curable resin composition and transparency or the cured product, and the evaluations were all at least A.

In addition, the evaluation of the strength of the cured product of the curable resin compositions of Examples 1 to 16 were at least A except for the B of Example 13. On the other hand, for Comparative Example 1, the evaluation of curability was A; however, the evaluations of transparency and strength of the cured product were both C due to not containing the (C) component. Concerning Comparative Example 2, sufficient polymerization reaction did not occur due to not containing the (B) component, and thus the evaluation of curability was C. Concerning Comparative Example 3, sufficient polymerization reaction did not occur due to not containing the (C) component, and thus the evaluation of curability was C.

INDUSTRIAL APPLICABILITY

According to the present invention, it is possible to provide a curable resin composition that cures at room temperature and for which a cured product having superior strength and transparency is obtained, a cured product thereof, a laminate including this cured product, and a method for producing a laminate thereof; therefore, it is extremely useful in industry.

EXPLANATION OF REFERENCE NUMERALS 10 laminate
12 substrate
16 intermediate layer (cured product)

The invention claimed is:

1. A curable resin composition comprising:
(A) a polymerizable (meth)acrylic-based monomer component;
(B) a thiourea compound component; and
(C) a peroxide component having a structure of the following formula (1),
wherein the composition may contain (D) a (meth)acrylic-based polymer component as an optional component,

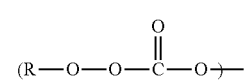

(1)

wherein R in the formula (1) is a hydrocarbon group with a carbon number of 1 to 15.

2. The curable resin composition according to claim 1, wherein
a content of the (A) component is 5 to 100 mass %, and
a content of the (D) component is 0 to 95 mass %,
relative to the total mass of the (A) component and the (D) component.

3. The curable resin composition according to claim 1, wherein
a content of the (A) component is 80 to 100 mass %, and
a content of the (D) component is 0 to 20 mass %,
relative to the total mass of the (A) component and the (D) component.

4. The curable resin composition according to claim 1, wherein
a content of the (A) component is 80 to 98 mass %, and
a content of the (D) component is 2 to 20 mass %,
relative to the total mass of the (A) component and the (D) component.

5. The curable resin composition according to claim 1,
wherein the (B) component is at least one compound selected from the group consisting of thiourea, ethylene thiourea, N,N'-dimethyl thiourea, N,N'-diethyl thiourea, N,N'-dipropyl thiourea, N,N'-di-n-butyl thiourea, N,N'-dilauryl thiourea, N,N'-diphenyl thiourea, trimethyl thiourea, 1-acetyl-2-thiourea and 1-benzoyl-2-thiourea; and
wherein the (C) component is at least one compound selected from the group consisting of t-hexylperoxy isopropyl monocarbonate, t-butylperoxy isopropyl monocarbonate, t-butylperoxy 2-ethylhexyl monocarbonate, t-butylperoxy allyl monocarbonate and 1,6-bis(t-butylperoxy carbonyloxy)hexane.

6. The curable resin composition according to claim 1, comprising:
0.05 to 5 parts by mass of the (C) component; and
0.1 to 10 parts by mass of the (D) components,
relative to a total of 100 parts by mass of the (A) component and the (D) component.

7. The curable resin composition according to claim 6,
wherein the (B) component is at least one compound selected from the group consisting of thiourea, ethylene thiourea, N,N'-dimethyl thiourea, N,N'-diethyl thiourea, N,N'-dipropyl thiourea, N,N'-di-n-butyl thiourea, N,N'-dilauryl thiourea, N,N'-diphenyl thiourea, trimethyl thiourea, 1-acetyl-2-thiourea and 1-benzoyl-2-thiourea; and
wherein the (C) component is at least one compound selected from the group consisting of t-hexylperoxy isopropyl monocarbonate, t-butylperoxy isopropyl monocarbonate, t-butylperoxy 2-ethylhexyl monocarbonate, t-butylperoxy allyl monocarbonate and 1,6-bis(t-butylperoxy carbonyloxy)hexane.

8. A cured product obtained by curing the curable resin composition according to claim 1.

9. A cured product obtained by curing the curable resin composition according to claim 5.

10. A cured product obtained by curing the curable resin composition according to claim 6.

11. A cured product obtained by curing the curable resin composition according to claim 7.

12. A laminate comprising a layer consisting of the cured product according to claim 8 between two substrates.

13. A laminate comprising a layer consisting of the cured product according to claim 9 between two substrates.

14. A laminate comprising a layer consisting of the cured product according to claim 10 between two substrates.

15. A laminate comprising a layer consisting of the cured product according to claim 11 between two substrates.

16. A method for producing the laminate according to claim 12, comprising:
pouring the curable resin composition according to claim 1 between two opposing substrates; and
curing the curable resin composition.

17. A method for producing the laminate according to claim 13, comprising:
pouring the curable resin composition according to claim 5 between two opposing substrates; and
curing the curable resin composition.

18. A method for producing the laminate according to claim 14, comprising:
pouring the curable resin composition according to claim 6 between two opposing substrates; and
curing the composition.

19. A method for producing the laminate according to claim 15, comprising:
pouring the curable resin composition according to claim 7 between two opposing substrates; and
curing the curable resin composition.

\* \* \* \* \*